United States Patent
Kersey et al.

(10) Patent No.: US 10,677,624 B2
(45) Date of Patent: Jun. 9, 2020

(54) TECHNIQUES TO DETERMINE A FLUID FLOW CHARACTERISTIC IN A CHANNELIZING PROCESS FLOWSTREAM, BY BIFURCATING THE FLOWSTREAM OR INDUCING A STANDING WAVE THEREIN

(71) Applicant: CiDRA Corporate Services Inc., Wallingford, CT (US)

(72) Inventors: Alan D. Kersey, South Glastonbury, CT (US); Douglas H. Loose, Southington, CT (US); Alex M. Van Der Spek, Rotterdam (NL)

(73) Assignee: CiDRA Corporate Services Inc., Wallingford, CT (US)

( * ) Notice: Subject to any disclaimer, the term of this patent is extended or adjusted under 35 U.S.C. 154(b) by 113 days.

(21) Appl. No.: 15/547,894

(22) PCT Filed: Feb. 5, 2016

(86) PCT No.: PCT/US2016/016731
§ 371 (c)(1),
(2) Date: Aug. 1, 2017

(87) PCT Pub. No.: WO2016/127033
PCT Pub. Date: Aug. 11, 2016

(65) Prior Publication Data
US 2018/0245959 A1     Aug. 30, 2018

Related U.S. Application Data

(60) Provisional application No. 62/112,450, filed on Feb. 5, 2015.

(51) Int. Cl.
*G01F 1/66* (2006.01)
*G01F 1/20* (2006.01)
(Continued)

(52) U.S. Cl.
CPC .............. *G01F 1/666* (2013.01); *G01F 1/206* (2013.01); *G01F 1/3254* (2013.01);
(Continued)

(58) Field of Classification Search
CPC .......... G01F 15/005; G01F 1/00; G01F 1/666; G01F 15/00; G01F 15/063; G01F 1/206;
(Continued)

(56) References Cited

U.S. PATENT DOCUMENTS

| 5,297,426 A | 3/1994 | Kane et al. |
| 6,889,562 B2 | 5/2005 | Gysling et al. |

(Continued)

OTHER PUBLICATIONS

Melikhan Tanyeri, et al.,Microfluidic Wheatstone Bridge for Rapid Sample Analysis,Dec. 21, 2011, p. 4181, England. http://www.rsc.org/suppdata/1c/cl/cllc20604d/cllc20604d.pdf.

*Primary Examiner* — Andre J Allen
(74) *Attorney, Agent, or Firm* — Ware, Fressola, Maguire & Barber LLP (57) ABSTRACT

The present invention provides a new and unique apparatus featuring a signal processor or processing module configured to: receive signaling containing information about a fluid flow passing through a pipe that is channelized causing flow variations in the fluid flow; and determine corresponding signaling containing information about a fluid flow characteristic of the fluid flow that depends on the flow variations caused in the fluid flow channelized, based upon the signaling received. The signal processor or processing module may be configured to provide the corresponding signaling, including where the corresponding signaling contains information about the fluid flow characteristic of the fluid flow channelized.

35 Claims, 6 Drawing Sheets

(51) Int. Cl.
*G01F 1/78* (2006.01)
*G01F 1/32* (2006.01)
*G01F 1/708* (2006.01)
*G01F 5/00* (2006.01)
*G01N 9/00* (2006.01)

(52) U.S. Cl.
CPC ............ *G01F 1/7082* (2013.01); *G01F 1/785* (2013.01); *G01F 5/00* (2013.01); *G01N 9/002* (2013.01)

(58) Field of Classification Search
CPC .......... G01F 1/3254; G01F 1/34; G01F 1/363; G01F 1/50; G01F 1/66; G01F 1/661; G01F 1/708; G01F 1/7082; G01F 1/72; G01F 1/74; G01F 1/785; G01F 23/2962; G01F 25/0007; G01F 5/00
See application file for complete search history.

(56) References Cited

U.S. PATENT DOCUMENTS

| | | |
|---|---|---|
| 7,607,361 B2 | 10/2009 | Unalmis et al. |
| 8,286,466 B2 | 10/2012 | Gysling |
| 2006/0079815 A1 | 4/2006 | Sato et al. |
| 2008/0173100 A1* | 7/2008 | Davis ...................... G01F 1/667 73/861.27 |
| 2011/0278218 A1 | 11/2011 | Dionne et al. |
| 2013/0199305 A1 | 8/2013 | Fernald |
| 2013/0284271 A1 | 10/2013 | Lipkens et al. |
| 2013/0298635 A1 | 11/2013 | Godfrey |
| 2014/0200836 A1* | 7/2014 | Lee ........................ G01F 1/34 702/47 |
| 2014/0318225 A1 | 10/2014 | Kersey |
| 2015/0027236 A1* | 1/2015 | Yoder ...................... G01F 1/76 73/861.357 |
| 2018/0231498 A1* | 8/2018 | Amir .................... G01N 29/024 |
| 2018/0306633 A1* | 10/2018 | Bar-Cohen .......... G01F 23/2962 |

* cited by examiner

```
┌─────────────────────────────────────────────────────────────────┐
│ Apparatus 100                                                   │
│   ┌───────────────────────────────────────────────────────┐     │
│   │ Signal processor or processing module 102 configured  │     │
│   │ at least to:                                          │     │
│   │                                                       │     │
│   │         receive signaling $S_{in}$ containing information about │
│   │ a fluid flow passing through a pipe that is channelized│    │
│   │ causing flow variations in the fluid flow; and        │     │
│   │                                                       │     │
│   │         determine corresponding signaling containing  │     │
│   │ information about a fluid flow characteristic of the fluid │ │
│   │ flow that depends on the flow variations of the fluid flow │ │
│   │ channelized, based upon the signaling received; and/or │    │
│   │                                                       │     │
│   │         provide the corresponding signaling $S_{out}$, including │
│   │ where the corresponding signaling $S_{out}$ contains  │     │
│   │ information about the fluid flow characteristic of the fluid │ │
│   │ flow channelized.                                     │     │
│   └───────────────────────────────────────────────────────┘     │
│                              │                                  │
│   ┌───────────────────────────────────────────────────────┐     │
│   │ Other signal processor circuits or components 104 that do not │ │
│   │ form part of the underlying invention, e.g., including input/output │ │
│$S_{in}$│ modules, one or more memory modules, data, address and │$S_{out}$│
│───│ control busing architecture, etc.                     │───  │
│   └───────────────────────────────────────────────────────┘     │
└─────────────────────────────────────────────────────────────────┘
```

Figure 1A: The Basic Apparatus

110

110a, Receive signaling $S_{in}$ containing information about a fluid flow passing through a pipe that is channelized causing flow variations in the fluid flow 110b, Determine corresponding signaling $S_{out}$ containing information about a fluid flow characteristic of the fluid flow that depends on the flow variations caused in the fluid flow channelized, based upon the signaling received 110c, Provide corresponding signaling $S_{out}$, including where the corresponding signaling $S_{out}$ contains information about the fluid flow characteristic of the fluid flow channelized

Figure 5A: Fixed Bridge

Figure 5B: Variable Bridge

Figure 5

TECHNIQUES TO DETERMINE A FLUID FLOW CHARACTERISTIC IN A CHANNELIZING PROCESS FLOWSTREAM, BY BIFURCATING THE FLOWSTREAM OR INDUCING A STANDING WAVE THEREIN

CROSS-REFERENCE TO RELATED APPLICATIONS

This application claims benefit to provisional patent application Ser. No. 62/112,450, filed 5 Feb. 2015, which is incorporated by reference in their entirety.

BACKGROUND OF THE INVENTION

1. Field of Invention

This invention relates to a technique for determining at least one fluid flow characteristics in a fluid flowing in a pipe.

2. Description of Related Art

Technique are known in the art for determining fluid flow characteristics of a fluid flowing in a pipe, e.g., using SONAR-based meters developed by the assignee of the present invention and disclosed by way of example in whole or in part in U.S. Pat. Nos. 7,165,464; 7,134,320; 7,363,800; 7,367,240; and 7,343,820, which are all incorporated by reference in their entirety.

SUMMARY OF THE INVENTION

In its broadest sense, the new and unique techniques, e.g., may include, or take the form of, a method and/or an apparatus, to determine at least one fluid flow characteristic of a fluid flow in a pipe, e.g., including flow rate, mass flow and density.

According to some embodiments of the present invention, the apparatus may feature at least one signal processor or signal processing module configured at least to:
  receive signaling containing information about a fluid flow passing through a pipe that is channelized causing flow variations in the fluid flow; and
  determine corresponding signaling containing information about a fluid flow characteristic of the fluid flow that depends on the flow variations caused in the fluid flow channelized, based upon the signaling received.

The signal processor or processing module may be configured to provide the corresponding signaling, including where the corresponding signaling contains information about the fluid flow characteristic of the fluid flow channelized.

Channelizing Fluid Flow by Using Induced Flow Perturbations

In summary, by way of example, channelized fluid flow techniques for determining one or more fluid flow characteristics according to the present invention may be based upon using a modulated ultrasonic standing wave that can induce flow perturbations in a fluid flow in a pipe, where induced flow perturbations channelize and cause the flow variations in the fluid flow, as follows:

In some embodiments, a strong standing wave may be generated upstream in the fluid flow (immediately prior to the SONAR-based flowmeter) by an ultrasonic signal coupled across and reflected back across the flow stream. The 'beating' of these signals creates the standing wave.

This standing wave acts as a 'comb' and 'channelizes' the flow through the nodes in the standing wave. Frequency modulation of an ultrasonic transducer about the resonant frequency will spatially shift the standing wave at the modulation frequency, e.g., the frequency modulation of the ultrasonic drive results in the 'comb' being swept back and forth across the cross-section of the pipe.

As the flow is channelized by the standing wave 'comb', the motion of the comb imparts momentum into the flow stream, which is used to induce downstream pressure variation sensed by or through the SONAR-based array.

According to such "induced flow perturbation" embodiments, the apparatus may include one or more of the following features:

For example, the signaling may contain information about the fluid flow that is channelized by inducing flow perturbations caused by a modulated standing wave across the pipe that sweeps back and forth across a flow cross-section of the pipe and imparts lateral momentum into a combed fluid flow.

The signaling may contain information about the modulated standing wave generated by an ultrasonic driver combination arranged in relation to the pipe.

The signaling may contain information about the modulated standing wave sensed by a SONAR-based sensing module arranged in relation to the pipe upstream from the ultrasonic driver combination.

The ultrasonic driver combination may include ultrasonic drivers arranged on one side of the pipe and an ultrasonic reflector plate arranged on an opposite side of the pipe.

The ultrasonic driver combination may include first ultrasonic drivers arranged on one side of the pipe and second ultrasonic drivers arranged on an opposite side of the pipe.

The signal processor or processing module may be configured as a synchronous SONAR processing module.

The fluid flow characteristic determined may include mass flow, flow rate or density.

The signaling received from the SONAR-based sensing module may contain information about oscillating momentum induced in the combed fluid flow through the pipe sensed with segmented PVDF bands that pick up pipe side wall pressure variations on opposite sides of the pipe.

The signaling received from the SONAR-based sensing module may contain information about the oscillating momentum induced in the combed fluid flow through the pipe sensed with first PVDF bands arranged on one side of the pipe and second PVDF bands arranged on an opposite side of the pipe, the first PVDF bands and the second PVDF bands arranged axially at a predetermined location along the pipe; and the signal processor or processing module may be configured to determine a difference proportional to a modulation frequency of the modulated standing wave caused by the oscillating momentum induced in the combed fluid flow.

The signaling received from the SONAR-based sensing module may contain information about the oscillating momentum induced in the combed fluid flow through the pipe sensed with corresponding first PVDF bands arranged on one corresponding side of the pipe and corresponding second PVDF bands arranged on a corresponding opposite side of the pipe, the corresponding first PVDF bands and the corresponding second PVDF bands arranged axially at a different predetermined location along the pipe than the first PVDF bands and the second PVDF bands; and the signal processor or processing module may be configured to determine a corresponding difference proportional to the modulation frequency of the modulated standing wave caused by the oscillating momentum induced in the fluid flowing through the pipe.

The signal processor or processing module may be configured to determine a phase difference proportional to a flow rate based upon the difference and corresponding difference proportional to the modulation frequency of the modulated standing wave caused by the oscillating momentum induced in the combed fluid flow through the pipe.

The modulated standing wave may have a resonant frequency that is spatially shifted at a modulation frequency so as to act as a "comb" and channelizes the combed fluid flow through nodes in the modulated standing wave.

The motion of the "comb" may impart the lateral momentum into the fluid flow through the pipe.

The lateral momentum may be proportional to the mass of the fluid flow through the pipe.

The lateral momentum may cause pressure variations downstream on a pipe wall that are sensed by segmented PVDF bands arranged on the pipe wall and that are proportional to a total comb-displaced flow mass per unit time.

The apparatus may include the SONAR-based sensing module and the ultrasonic driver combination.

Channelizing Fluid Flow by Using Bifurcated Bridge

In summary, and by way of further example, channelized fluid flow techniques for determining one or more fluid flow characteristics according to the present invention may also be based upon using a bifurcated bridge approach, where bridging paths channelize and cause the flow variations in the fluid flow, as follows:

According to such "bifurcated bridge" embodiments, the apparatus may include one or more of the following features:

The signaling may contain information about the fluid flow that is channelized by bifurcating the fluid flow through a bridge having two pipe paths/channels fluidically coupled by a balance flow meter as a bifurcated fluid flow.

The two pipe paths/channels may include a first pipe path/channel having a first path/channel element with a first flow resistance and a second path/channel element with a second flow resistance, and a second pipe path/channel having a corresponding first path/channel element with a corresponding first flow resistance and a corresponding second path/channel element with a corresponding second flow resistance.

The first flow resistance may be strongly dependent of a flow rate of the bifurcated fluid flow in a first fluid path/channel, including the length of the first path/channel element with a contoured/textured inner diameter surface; and the second flow resistance may be weakly dependent on the bifurcated fluid flow in the first fluid path/channel.

The corresponding first flow resistance may be controllable via an actuator control valve in a second fluid path/channel; and the corresponding second flow resistance may be weakly dependent on the bifurcated fluid flow in the second fluid path/channel.

The corresponding first flow resistance may be controllable via an actuator control valve in a second fluid path/channel; and the corresponding second flow resistance may be weakly dependent on the bifurcated fluid flow in the second fluid path/channel.

The two pipe paths/channels may be fluidically connected at a center bridge point with the balance flow meter configured to detect in the bifurcated fluid flow through the two pipe paths/channels.

The balance flow meter may be a Coriolis meter configured to read zero when the bridge is balanced.

The two pipe paths/channels may be fluidically connected at a center bridge point with a Coriolis meter configured to detect in the fluid flow through the two pipe paths/channels, and the signaling received from the Coriolis meter may contain information about the total flow rate, including where a measure of flow through the Coriolis meter is proportional to the total flow rate through the bridge.

The first flow resistance may be controllable via an actuator control valve in a first fluid path/channel; the second flow resistance may be weakly dependent on the bifurcated fluid flow in the first fluid path/channel; the corresponding first flow resistance may be controllable via a corresponding actuator control valve in a second fluid path/channel; and the corresponding second flow resistance may be weakly dependent on the bifurcated fluid flow in the second fluid path/channel.

Other Embodiments

According to some embodiments of the present invention, the method may take the form of steps for receiving in a signal processor or processing module signaling containing information about a fluid flow passing through a pipe that is channelized causing flow variations in the fluid flow; and for determining with the signal processor or processing module corresponding signaling containing information about a fluid flow characteristic of the fluid flow that depends on the flow variations caused in the fluid flow channelized, based upon the signaling received. The method may also include providing with the signal processor or processing module the corresponding signaling, including where the corresponding signaling contains information about the fluid flow characteristic of the fluid flow channelized.

According to some embodiments of the present invention, the apparatus may also take the form of a computer-readable storage medium having computer-executable components for performing the steps of the aforementioned method.

BRIEF DESCRIPTION OF THE DRAWING

The drawing includes FIGS. 1-5B, which are not drawn to scale, as follows:

FIG. 2 includes FIGS. 2A and 2B, where

FIG. 3 includes FIGS. 3A and 3B, where

FIG. 5 includes FIGS. 5A and 5B, where

DETAILED DESCRIPTION OF BEST MODE OF THE INVENTION

Figure 1A:
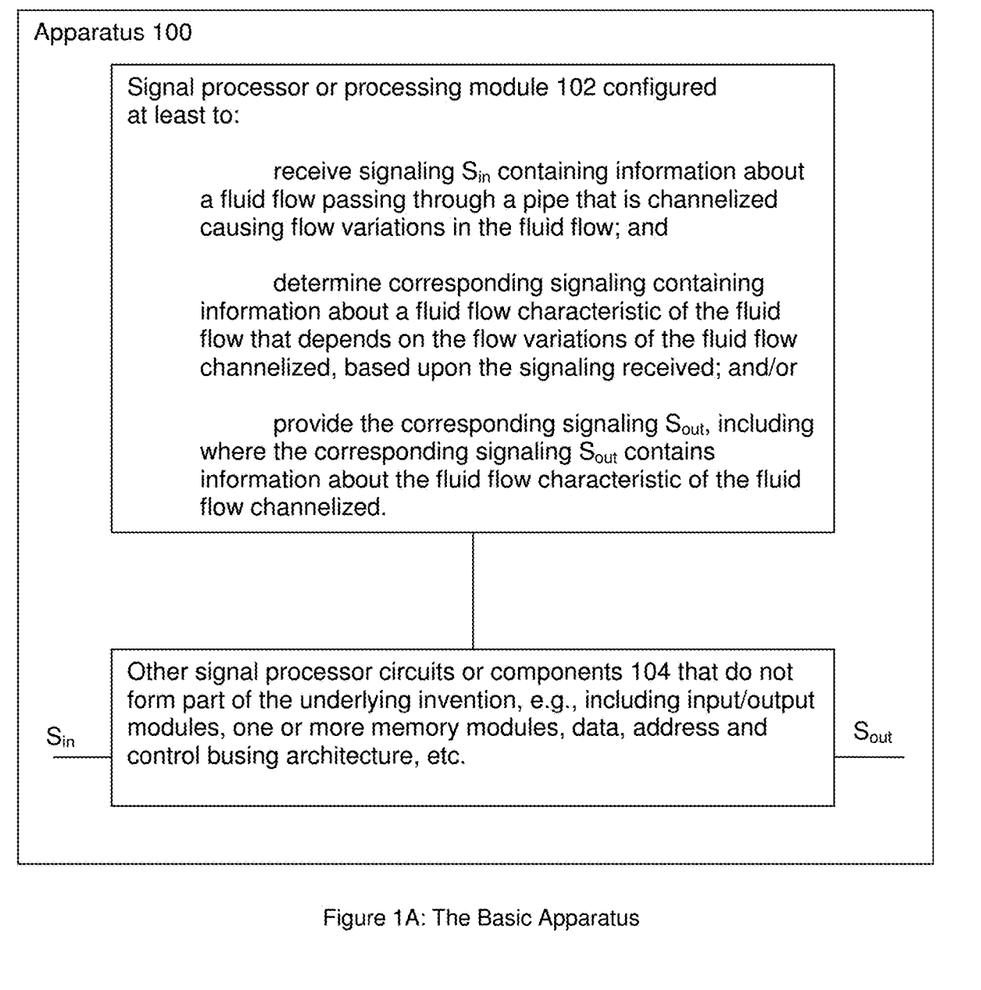
FIG. 1A is a block diagram of apparatus having a signal processor or signal processing module for implementing the signal processing according to the present invention.

By way of example, FIG. 1A shows apparatus generally indicated as 100, e.g. having at least one signal processor or signal processing module 102 for implementing the signal processing functionality according to the present invention. In operation, the at least one signal processor or signal processing module 102 may be configured at least to:
receive signaling Sin containing information about a fluid flow passing through a pipe that is channelized causing flow variations in the fluid flow; and
determine corresponding signaling $S_{out}$ containing information about a fluid flow characteristic of the fluid flow that depends on the flow variations caused in the fluid flow channelized, based upon the signaling received.

The at least one signal processor or signal processing module 102 may also be configured to provide the corresponding signaling $S_{out}$. By way of example, the corresponding signaling $S_{out}$ provided may include, take the form of, or contain information about the fluid flow characteristic of the fluid flow that depends on the flow variations caused in the fluid flow channelized.

For example, a person skilled in the art would appreciate and understanding without undue experimentation, especially after reading the instant patent application together with that known in the art, e.g., how to implement suitable signaling processing functionality to make one or more such determinations.

FIGS. 2A Through 3B

In summary, FIGS. 2A through 3B show techniques according to the present invention based upon using a modulated ultrasonic standing wave that can induce flow perturbations in a fluid flow in a pipe. The techniques take on the form of a so-called Coriolis-like flowmeter.

By way of example, a strong standing wave may be generated upstream that 'channelizes' the flow through nodes in the standing wave generated.

Frequency modulation of an ultrasonic transducer about the resonant frequency will spatially shift the standing wave at the modulation frequency.

The motion of the 'comb imparts momentum into the flow stream.

This momentum is proportional to the mass of the flow passing through the comb per unit time Lateral momentum is manifested as pressure variations downstream on the pipe-wall.

Pressure variations, e.g., detected by segmented PVDF bands arranged on the pipe, are proportional to the total comb-displaced flow mass per unit time.

Pressure differential (left-right) is a function of the imparted momentum.

Phase difference between sensor pairs (1) and (2) is proportional to the flow velocity.

This approach may be used to yield mass, flow rate and density.

Figure 2A:
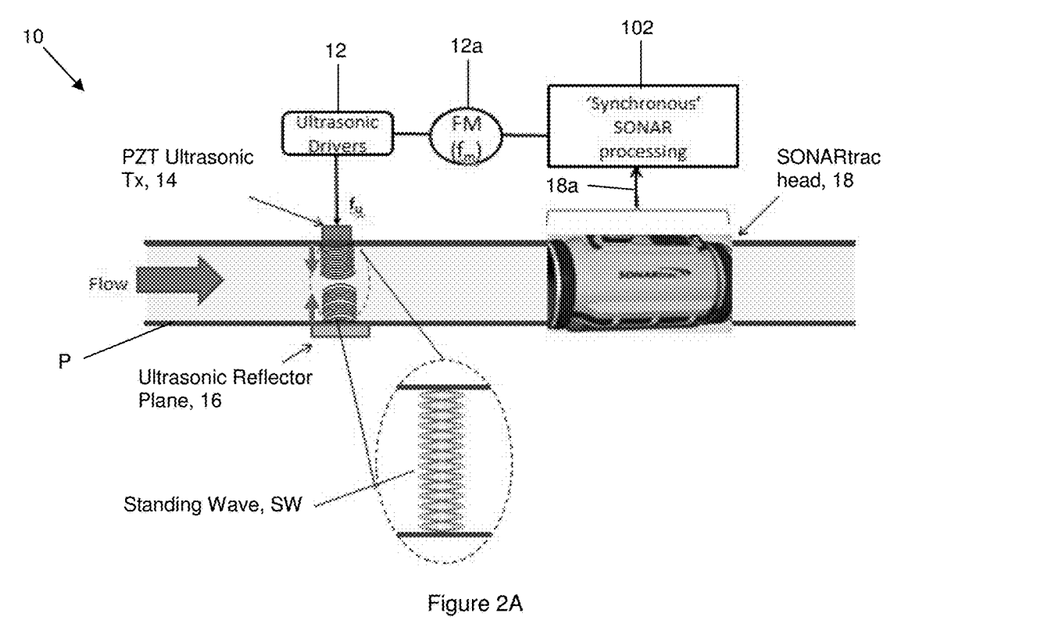
FIG. 2A is a diagram showing apparatus for generating an upstream modulated standing wave causing induced flow perturbations that channelize the fluid flow for sensing using downstream SONAR-based sensing and processing, according to some embodiments of the present invention; and where

FIG. 2A

By way of example, FIG. 2A shows apparatus generally indicated as 10 according to the present invention, in which "synchronous" SONAR processing may be used in conjunction with a modulated ultrasonic standing wave that can induce flow perturbations.

In FIG. 2A, the apparatus 10 includes an ultrasonic combination having one or more ultrasonic drivers 12, a PZT ultrasonic Transmitter (Tx) 14 arranged on one side of a pipe P, an ultrasonic reflector plate 16 arranged on an opposite side of the pipe P, which together combine to generate a standing wave SW across the pipe P at the resonances of the ultrasonic signals, e.g., when the ultrasonic frequency (fu) matches frequencies m*fp, where the term fp is the 'across-pipe' fundamental frequency, and the term m is the harmonic number. This relationship is determined by, and depends on, the pipe diameter and fluid speed of sound (SoS). By way of an example, this produces a spatial period of ~0.5 mm in the standing wave in water (@ 1.5 MHz). The modulation of the ultrasonic frequency (fu) sweeps this standing wave SW back and forth across the flow cross-section and imparts lateral momentum into the flow in the pipe.

In FIG. 2A, the apparatus 10 also includes a SONAR-based head or device 18 arranged on the pipe P downstream of the ultrasonic combination, that senses the lateral momentum imparted into the flow, and provides SONAR-based signaling 18a containing information about the lateral momentum imparted into the flow. By way of example, the SONAR-based head or device 18 may take the form of a device known in the industry as SONARtrac®, which was developed by the assignee of the present application.

In FIG. 2A, the apparatus 10 also includes a synchronous SONAR processing unit, which may include, or take the form of, a signal processor or signal processing module like element 102 (FIG. 1). In operation, the synchronous SONAR processing unit receives ultrasonic driver signaling FM ($f_m$) 12a containing information about the standing wave SW generated, and also receives SONAR-based signaling 18a containing information about the lateral momentum imparted into the flow, which together contain information about the fluid flow passing through the pipe P that is channelized causing flow variations in the fluid flow. In response to this signaling received, the synchronous SONAR processing unit determines corresponding signaling containing information about a fluid flow characteristic of the fluid flow that depends on the flow variation caused in the fluid flow channelized.

Figure 2B:
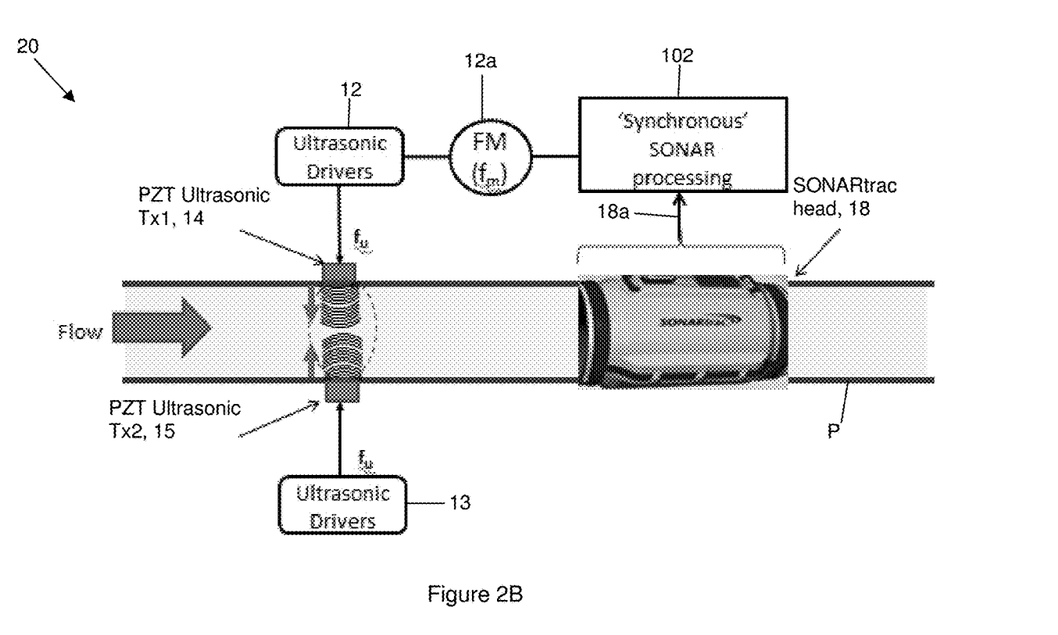
FIG. 2B is a diagram showing apparatus for generating an upstream modulated standing wave causing induced flow perturbations in the fluid flow sensed using downstream SONAR-based sensing and processing, according to some embodiments of the present invention.

FIG. 2B

By way of further example, FIG. 2B shows apparatus generally indicated as 20 according to the present invention, in which "synchronous" SONAR processing may be used in conjunction with a modulated ultrasonic standing wave that can induce flow perturbations.

In FIG. 2B, elements similar to those shown in FIG. 2A have similar reference numbers. Moreover, the differences between that shown in FIGS. 2A and 2B are set forth as follows:

In contrast to that shown in FIG. 2A, the apparatus 20 shown in FIG. 2B uses a double ultrasonic transmitter (Tx1, Tx2) system arranged on opposite sides of the pipe P. In effect, the ultrasonic reflector plate 16 is replaced by a second ultrasonic transmitter (Tx2) system having one or more second ultrasonic drivers 13 and a second PZT ultrasonic transmitter (Tx2) 15. In operation, each ultrasonic transmitter (Tx1, Tx2) system generates a standing wave on the opposite sides of the pipe P. The double ultrasonic (Tx1, Tx2) system allows for more control over the standing wave modulation, as a person skilled in the art would appreciate.

Figure 3A:
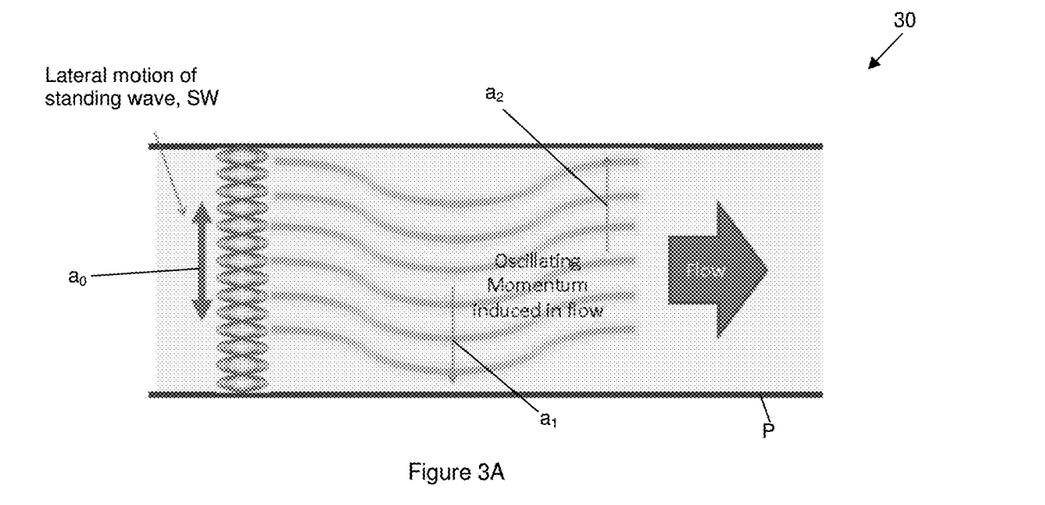
FIG. 3A is a diagram showing the upstream modulated standing wave causing the induced flow perturbations in the fluid flow for sensing downstream, according to some embodiments of the present invention; and where

FIG. 3A

FIG. 3A shows an illustration generally indicated as 30 of how a modulated ultrasonic standing wave imparts lateral momentum in the downstream flow. For example, in FIG. 3A the lateral motion of the standing wave SW generated is indicated by an up/down arrow $a_0$, and the oscillating momentum induced in the flow in the pipe P is indicated by an upstream downwardly pointing arrow $a_1$ and a downstream upwardly pointing arrow $a_2$. The oscillating momentum induced in the flow in the pipe P is detectable by a downstream SONAR-based array as a periodic pressure variation, e.g., consistent with that set forth herein.

Figure 3B:
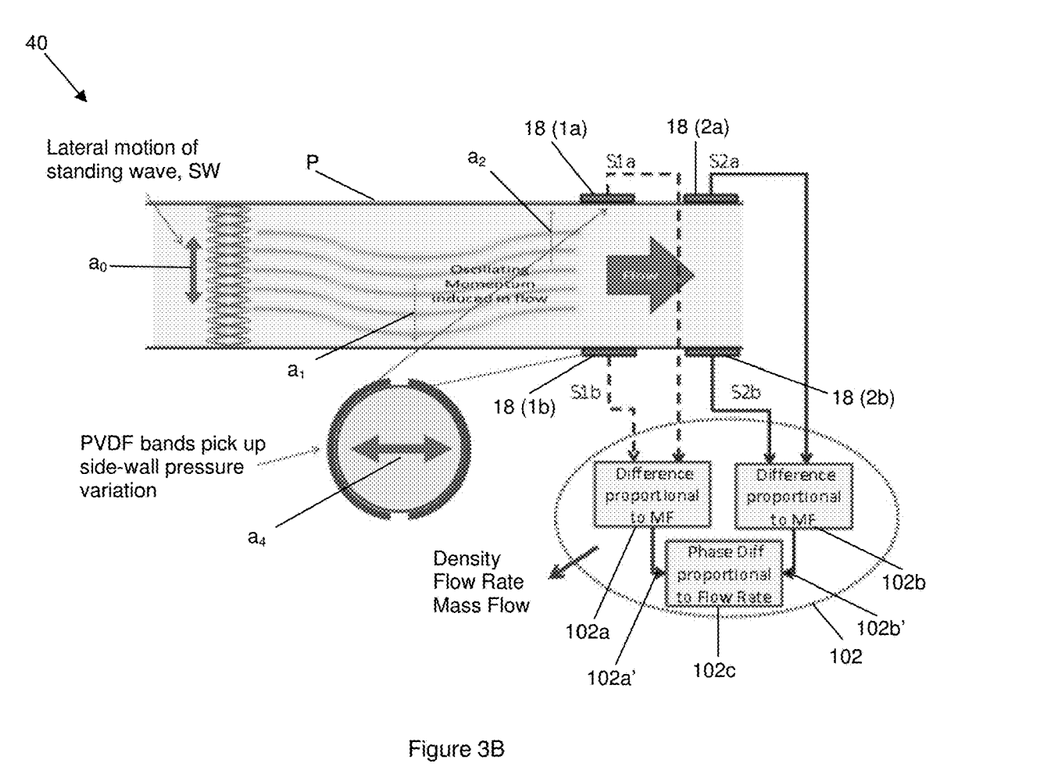
FIG. 3B is a diagram showing the upstream modulated standing wave causing the induced flow perturbations in the fluid flow, two pairs of downstream PVDF bands arranged on opposite sides of the pipe, and a SONAR-based processing unit, according to some embodiments of the present invention.

FIG. 3B: The Virtual Coriolis-Like Flowmeter Concept

By way of example, FIG. 3B shows apparatus generally indicated as 40 according to the present invention that takes the form of a virtual Coriolis-like flowmeter arranged downstream of a standing wave SW generated upstream. Similar to that shown in FIG. 3A, in FIG. 3B the lateral motion of the standing wave SW generated is indicated by an up/down arrow $a_0$, and the oscillating momentum induced in the flow in the pipe P is indicated by an upstream downwardly pointing arrow $a_1$ and a downstream upwardly pointing arrow $a_2$. The oscillating momentum induced in the flow in the pipe P is detectable by a downstream SONAR-based array as a periodic pressure variation, e.g., consistent with that set forth herein.

FIG. 3B shows the downstream SONAR-based array in the form of PVDF bands that pick up side-wall pressure variations as indicated by arrow $a_4$. By way of example, one set of PVDF bands are indicated as reference labels 18(1a), 18(1b), and the other set of PVDF bands arranged further downstream on the pipe P are indicated as reference labels 18(2a), 18(2b). The PVDF bands 18(1a), 18(1b) respond to the pressure variations and provide respective PVDF band signaling S1a, S1b; S2a, S2b containing information about the lateral momentum imparted into the flow, which form part of the signaling information about the fluid flow passing through the pipe P that is channelized causing flow variations in the fluid flow.

In FIG. 3B, the apparatus also includes a SONAR-based processing unit, which may include, or take the form of, a signal processor or signal processing module like element 102 (FIG. 1). The synchronous SONAR processing unit may be configured with signal processing modules 102a, 102b, 102c for implementing the following signal processing functionality. For example, the signal processing modules 102a may be configured to receive the respective PVDF band signaling S1a, S1b, as well as the ultrasonic driver signaling FM ($f_m$) as described herein, and determine first difference signaling 102a' containing information about a difference proportional to the modulation frequency (MF) in relation to the pressure variation sensed by the PVDF bands 18(1a), 18(1b). In addition, the signal processing modules 102b may be configured to receive the respective PVDF band signaling S2a, S2b, as well as the ultrasonic driver signaling FM ($f_m$) as described herein, and determine second difference signaling 102b' containing information about a difference proportional to the modulation frequency (MF) in relation to the pressure variation sensed by the PVDF bands 18(2a), 18(2b). Furthermore, the signal processing modules 102c may be configured to receive the first difference signaling 102a' and the second difference signaling 102b', and determine third signaling containing information about a phase difference proportional to a flow rate. The SONAR-based processing unit may be configured to further process the third signaling in order to determine suitable corresponding signaling containing information about the flow rate of the fluid flow in the pipe, as well as other fluid flow characteristics like density and mass flow, e.g., consistent with that set forth herein.

Figure 4:
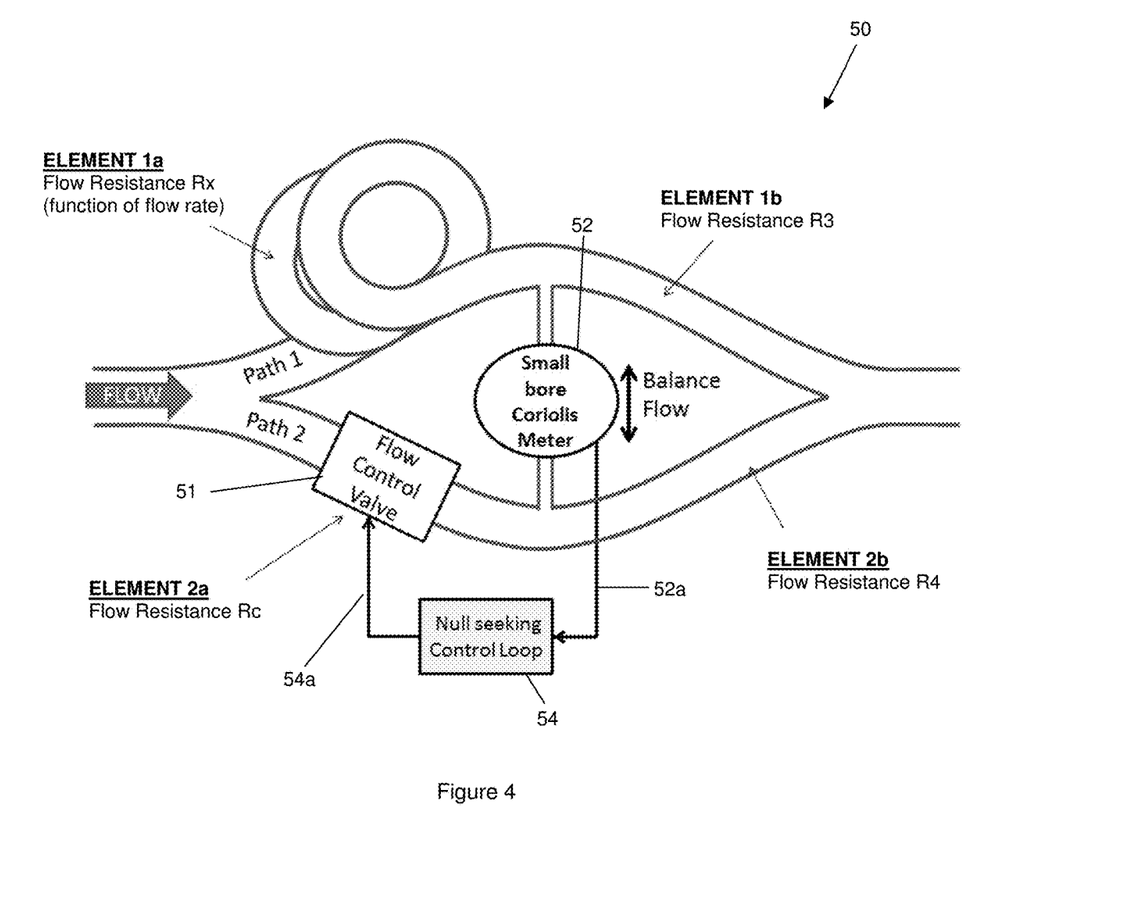
FIG. 4 is a diagram showing apparatus for bifurcating the fluid flow causing directional fluid flow changes that channelizes the fluid flow for sensing in two flow paths, according to some embodiments of the present invention.

FIG. 4: Bridge Flowmeter (for Laminar Flow)

By way of example, FIG. 4 shows apparatus generally indicated as 50 according to the present invention that takes the form of a bridge flowmeter, which operates as follows:

Flow in the pipe is bifurcated into two flow paths (1) and (2).

Flow path 1 comprises two flow elements 1a, 1b that have or provide resistance to the flow of fluid.

The first element 1a, has a resistance Rx to flow that is strongly dependent on the flow rate (such as a length of pipe with contoured/Textured ID surface), and the second element 1b has a flow resistance which is weakly dependent on flow.

Flow path 2 comprises two corresponding elements 2a, 2b that have corresponding resistance to the flow of fluid.

The first element 2a has a resistance to flow that is controllable via an actuator control valve 51, the second element 2b, and also has a flow resistance which is weakly dependent on flow.

The bridge flowmeter 50 may also include a meter 52 configured to detect any imbalance in the bridge flowmeter 50. By way of example, the meter 52 may include, or take the form of, a small bore Coriolis meter that is a sensitive flowmeter, e.g., connected at a bridge center point as shown.

When the bridge flowmeter 50 is balanced, the small bore Coriolis meter 52 will provide meter signaling 52a containing information about a reading of a zero flow.

As the input flow rate increases, the flow resistance Rx increases, and the flow resistance Rc will need to be adjusted to rebalance the flow (to null the Coriolis reading). The bridge flowmeter 50 may include a null seeking control loop 54 that responds to the meter signaling 52a, and provides control loop signal 54a to the actuator control valve 51 to adjust and rebalance the flow.

In operation, a measurement of the flow resistance Rc (actuation level) corresponds to a measure of the total flow rate, and may be used to determine the flow rate characteristic related to the flow rate of the fluid flow in the pipe.

Figure 5A:
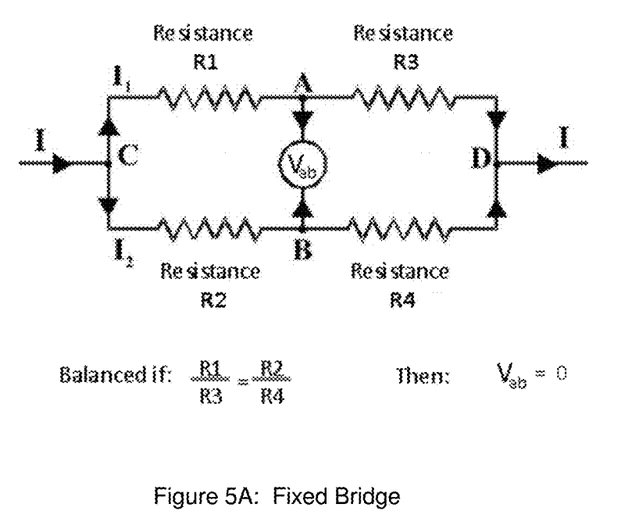
FIG. 5A shows a fixed bridge circuit for analogizing the bifurcating of a fluid flow causing directional fluid flow changes that channelizes the fluid flow for sensing in two flow paths, according to some embodiments of the present invention; and where
Figure 5B:
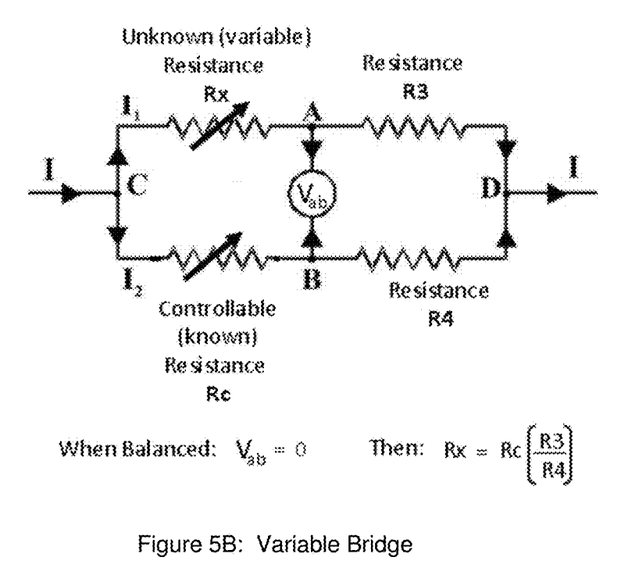
FIG. 5B shows a variable bridge circuit for analogizing the bifurcating of a fluid flow causing directional fluid flow changes that channelizes the fluid flow for sensing in two flow paths, according to some embodiments of the present invention.

FIGS. 5A and 5B: Resistive Bridge Flowmeter Concepts

FIGS. 5A and 5B show illustrations analogous to resistive bridge flowmeter concepts, according to the present invention.

FIG. 5A shows a fixed bridge analog circuit having current I bifurcated at a point C from one flow path into two flow paths having current $I_1$ and $I_2$, and rejoined at a point D back into one flow path having the current I. The first flow path includes fixed resistances R1 and R3 joined at a center point A, and the second flow path includes fixed resistances R2 and R4 joined at a center point B. A voltage device $V_{ab}$ is configured between the two center points A and B. In operation, the fixed bridge analog circuit is balanced if: the ratio of R1/R3=R2/R4, such that $V_{ab}$=0. In contrast, the fixed bridge analog circuit is not balanced if: the ratio of R1/R3>R2/R4 or R1/R3<R2/R4, such that $V_{ab}$ is not 0.

In comparison, FIG. 5B shows a variable bridge analog circuit having current I bifurcated at a point C from one flow path into two flow paths having current $I_1$ and $I_2$, and rejoined at a point D back into one flow path having the current I. The first flow path includes an unknown (variable) resistance Rx and a fixed resistance R3 joined at a center point A, and the second flow path includes a controllable (known) resistance Rc and a fixed resistance R4 joined at a center point B. A voltage device $V_{ab}$ is configured between the two center points A and B. In operation, the variable bridge analog circuit is balanced if: Rx=the product of Rc times the ratio (R3/R4), such that $V_{ab}$=0.

In each case, the principle can also be applied with a balanced bridge, where all resistances are flow-dependent. Similar to that set forth above, a measure of flow through the Coriolis meter is then proportional to the total flow rate through the bridge.

The Signal Processor or Processor Module 102

The functionality of the signal processor or processor module 102 may be implemented using hardware, software, firmware, or a combination thereof. In a typical software implementation, the processor module may include one or more microprocessor-based architectures having a microprocessor, a random access memory (RAM), a read only memory (ROM), input/output devices and control, data and address buses connecting the same, e.g., consistent with that shown in FIG. 1, e.g., see element 104. A person skilled in the art would be able to program such a microprocessor-based architecture(s) to perform and implement such signal processing functionality described herein without undue experimentation. The scope of the invention is not intended to be limited to any particular implementation using any such microprocessor-based architecture or technology either now known or later developed in the future.

By way of example, the apparatus 100 may also include, e.g., other signal processor circuits or components 104 that do not form part of the underlying invention, e.g., including input/output modules, one or more memory modules, data, address and control busing architecture, etc. In operation, the at least one signal processor or signal processing module 102 may cooperation and exchange suitable data, address and control signaling with the other signal processor circuits or components 104 in order to implement the signal processing functionality according to the present invention. By way of example, the signaling Sin may be received by such an input module, provided along such a data bus and stored in such a memory module for later processing, e.g., by the at least one signal processor or signal processing module 102. After such later processing, processed signaling resulting from any such determination may be stored in such a memory module, provided from such a memory module along such a data bus to such an output module, then provided from such an output module as the corresponding signaling $S_{out}$, e.g., by the at least one signal processor or signal processing module 102.

Figure 1B:
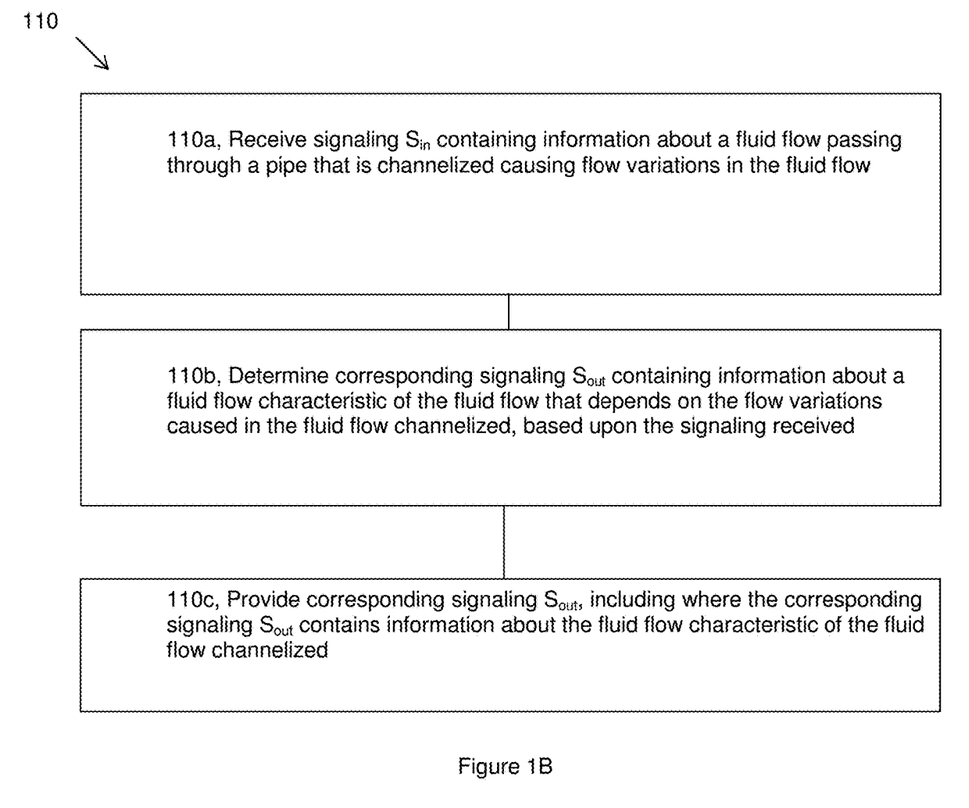
FIG. 1B is a flowchart of a method having steps for implementing the signal processing according to the present invention.

FIG. 1B

FIG. 1B shows a flowchart generally indicated as 110 for a method having steps 110a, 110b and 110c for implementing the signal processing functionality, e.g., with at least one signal processor or signal processing module like element 102 in FIG. 4, according to some embodiments of the present invention.

The method 100 may include a step 110a for responding with at least one signal processor or signal processing module to signaling containing information about a fluid flow passing through a pipe that is channelized causing flow variations in the fluid flow; and a step 110b for determining with the at least one signal processor or signal processing module corresponding signaling containing information about a fluid flow characteristic of the fluid flow that depends on the flow variations caused in the fluid flow channelized, based upon the signaling received. The method 100 may also include a step 110c for providing the corresponding signaling, including where the corresponding signaling provided contains information about the fluid flow characteristic of the fluid flow that depends on the flow variations caused in the fluid flow channelized.

The method may also include one or more steps for implementing other features of the present invention set forth herein, including steps for making the various determinations associated with one or more signal processing algorithms or techniques, e.g., consistent with that set forth herein.

SONAR-Based Meters

The SONAR-based meters like element 18 are known in the art and may take the form of a SONAR-based VF/GVF-100 meter, developed by the assignee of the present application, and disclosed by way of example in whole or in part in U.S. Pat. Nos. 7,165,464; 7,134,320; 7,363,800; 7,367,240; and 7,343,820, all of which are incorporated by reference in their entirety. The scope of the invention is also intended to include other types or kinds of SONAR-based VF/GVF meters either now known or later developed in the future that perform the same basic functionality of the SONAR-based VF/GVF meter 12 as such functionality relates to implementing the present invention.

THE SCOPE OF THE INVENTION

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. Apparatus comprising:
   a signal processor or processing module configured to:
   receive signaling containing information about a fluid flow passing through a pipe that is channelized causing flow variations in the fluid flow by inducing flow perturbation caused by a modulated standing wave across the pipe that sweeps back and forth across a flow cross-section of the pipe and imparts lateral momentum into a combed fluid flow; and
   determine corresponding signaling containing information about a fluid flow characteristic of the fluid flow that depends on the flow variations caused in the fluid flow channelized, based upon the signaling received.

2. Apparatus according to claim 1, wherein the signal processor or processing module is configured to provide the corresponding signaling, including where the corresponding signaling contains information about the fluid flow characteristic of the fluid flow channelized.

3. Apparatus according to claim 1, wherein the signaling contains information about the modulated standing wave generated by an ultrasonic driver combination arranged in relation to the pipe.

4. Apparatus according to claim 3, wherein the signaling contains information about the modulated standing wave sensed by a SONAR-based sensing module arranged in relation to the pipe upstream from the ultrasonic driver combination.

5. Apparatus according to claim 4, wherein the ultrasonic driver combination comprises ultrasonic drivers arranged on one side of the pipe and an ultrasonic reflector plate arranged on an opposite side of the pipe.

6. Apparatus according to claim 4, wherein the ultrasonic driver combination comprises first ultrasonic drivers arranged on one side of the pipe and second ultrasonic drivers arranged on an opposite side of the pipe.

7. Apparatus according to claim 4, wherein the signal processor or processing module is configured as a synchronous SONAR processing module.

8. Apparatus according to claim 4, wherein the fluid flow characteristic determined includes fluid mass, flow rate or density.

9. Apparatus according to claim 4, wherein the signaling received from the SONAR-based sensing module contains information about oscillating momentum induced in the combed fluid flow through the pipe sensed with segmented PVDF bands that pick up pipe side wall pressure variations on opposite sides of the pipe.

10. Apparatus according to claim 9, wherein
    the signaling received from the SONAR-based sensing module contains information about the oscillating momentum induced in the combed fluid flow through the pipe sensed with first PVDF bands arranged on one side of the pipe and second PVDF bands arranged on an opposite side of the pipe, the first PVDF bands and the second PVDF bands arranged axially at a predetermined location along the pipe; and
    the signal processor or processing module is configured to determine a difference proportional to a modulation frequency of the modulated standing wave caused by the oscillating momentum induced in the combed fluid flow.

11. Apparatus according to claim 10, wherein
    the signaling received from the SONAR-based sensing module contains information about the oscillating momentum induced in the combed fluid flow through the pipe sensed with corresponding first PVDF bands arranged on one corresponding side of the pipe and corresponding second PVDF bands arranged on a corresponding opposite side of the pipe, the corresponding first PVDF bands and the corresponding second PVDF bands arranged axially at a different predetermined location along the pipe than the first PVDF bands and the second PVDF bands; and
    the signal processor or processing module is configured to determine a corresponding difference proportional to the modulation frequency of the modulated standing wave caused by the oscillating momentum induced in the fluid flowing through the pipe.

12. Apparatus according to claim 11, wherein the signal processor or processing module is configured to determine a phase difference proportional to a flow rate based upon the difference and corresponding difference proportional to the modulation frequency of the modulated standing wave caused by the oscillating momentum induced in the combed fluid flow through the pipe.

13. Apparatus according to claim 1, wherein the modulated standing wave has a resonant frequency that is spatially shifted at a modulation frequency so as to act as a "comb" and channelizes the combed fluid flow through nodes in the modulated standing wave.

14. Apparatus according to claim 13, wherein the motion of the "comb" imparts the lateral momentum into the fluid flow through the pipe.

15. Apparatus according to claim 14, wherein the lateral momentum is proportional to the mass of the fluid flow through the pipe.

16. Apparatus according to claim 15, wherein the lateral momentum causes pressure variations downstream on a pipe wall that are sensed by segmented PVDF bands arranged on the pipe wall and that are proportional to a total comb-displaced flow mass per unit time.

17. Apparatus according to claim 4, wherein the apparatus comprises the SONAR-based sensing module and the ultrasonic driver combination.

18. Apparatus according to claim 12, wherein the apparatus comprises the SONAR-based sensing module and the ultrasonic driver combination.

19. Apparatus comprising:
    a signal processor or processing module configured to:
    receive signaling containing information about a fluid flow passing through a pipe that is channelized causing flow variations in the fluid flow by bifurcating the fluid flow through a bridge having two pipe paths/channels fluidically coupled by a balance flow meter as a bifurcated fluid flow; and
    determine corresponding signaling containing information about a fluid flow characteristic of the fluid flow that depends on the flow variations caused in the fluid flow channelized, based upon the signaling received.

20. Apparatus according to claim 19, wherein the two pipe paths/channels comprise a first pipe path/channel having a first path/channel element with a first flow resistance and a second path/channel element with a second flow resistance, and a second pipe path/channel having a corresponding first path/channel element with a corresponding first flow resistance and a corresponding second path/channel element with a corresponding second flow resistance.

21. Apparatus according to claim 20, wherein
the first flow resistance is strongly dependent of a flow rate of the bifurcated fluid flow in a first fluid path/channel, including the length of the first path/channel element with a contoured/textured inner diameter surface; and
the second flow resistance is weakly dependent on the bifurcated fluid flow in the first fluid path/channel.

22. Apparatus according to claim 21, wherein
the corresponding first flow resistance is controllable via an actuator control valve in a second fluid path/channel; and
the corresponding second flow resistance is weakly dependent on the bifurcated fluid flow in the second fluid path/channel.

23. Apparatus according to claim 20, wherein
the corresponding first flow resistance is controllable via an actuator control valve in a second fluid path/channel; and
the corresponding second flow resistance is weakly dependent on the bifurcated fluid flow in the second fluid path/channel.

24. Apparatus according to claim 20, wherein the two pipe paths/channels are fluidically connected at a center bridge point with the balance flow meter configured to detect in the bifurcated fluid flow through the two pipe paths/channels.

25. Apparatus according to claim 24, wherein the balance flow meter is a Coriolis meter configured to read zero when the bridge is balanced.

26. Apparatus according to claim 22, wherein
the two pipe paths/channels are fluidically connected at a center bridge point with a Coriolis meter configured to detect in the fluid flow through the two pipe paths/channels, and
the signaling received from the Coriolis meter contains information about the total flow rate, including where a measure of flow through the Coriolis meter is proportional to the total flow rate through the bridge.

27. Apparatus according to claim 20, wherein
the first flow resistance is controllable via an actuator control valve in a first fluid path/channel;
the second flow resistance is weakly dependent on the bifurcated fluid flow in the first fluid path/channel;
the corresponding first flow resistance is controllable via a corresponding actuator control valve in a second fluid path/channel; and
the corresponding second flow resistance is weakly dependent on the bifurcated fluid flow in the second fluid path/channel.

28. A method comprising:
receiving in a signal processor or processing module signaling containing information about a fluid flow passing through a pipe that is channelized causing flow variations in the fluid flow by inducing flow perturbations caused by a modulated standing wave across the pipe that sweeps back and forth across a flow cross-section of the pipe and imparts lateral momentum into a combed fluid flow; and
determining with the signal processor or processing module corresponding signaling containing information about a fluid flow characteristic of the fluid flow that depends on the flow variations caused in the fluid flow channelized, based upon the signaling received.

29. A method according to claim 28, wherein the method also comprises providing with the signal processor or processing module the corresponding signaling, including where the corresponding signaling contains information about the fluid flow characteristic of the fluid flow channelized.

30. Apparatus comprising:
means for receiving signaling containing information about a fluid flow passing through a pipe that is channelized causing flow variations in the fluid flow by inducing flow perturbations caused by a modulated standing wave across the pipe that sweeps back and forth across a flow cross-section of the pipe and imparts lateral momentum into a combed fluid flow; and
means for determining corresponding signaling containing information about a fluid flow characteristic of the fluid flow that depends on the flow variations caused in the fluid flow channelized, based upon the signaling received.

31. Apparatus according to claim 30, wherein the apparatus also comprises means for providing with the signal processor or processing module the corresponding signaling, including where the corresponding signaling contains information about the fluid flow characteristic of the fluid flow channelized.

32. A method comprising:
receiving in a signal processor or processing module signaling containing information about a fluid flow passing through a pipe that is channelized causing flow variations in the fluid flow by bifurcating the fluid flow through a bridge having two pipe paths/channels fluidically coupled by a balance flow meter as a bifurcated fluid flow; and
determining with the signal processor or processing module corresponding signaling containing information about a fluid flow characteristic of the fluid flow that depends on the flow variations caused in the fluid flow channelized, based upon the signaling received.

33. A method according to claim 32, wherein the method also comprises providing with the signal processor or processing module the corresponding signaling, including where the corresponding signaling contains information about the fluid flow characteristic of the fluid flow channelized.

34. Apparatus comprising:
means for receiving signaling containing information about a fluid flow passing through a pipe that is channelized causing flow variations in the fluid flow by bifurcating the fluid flow through a bridge having two pipe paths/channels fluidically coupled by a balance flow meter as a bifurcated fluid flow; and
means for determining corresponding signaling containing information about a fluid flow characteristic of the fluid flow that depends on the flow variations caused in the fluid flow channelized, based upon the signaling received.

35. Apparatus according to claim 34, wherein the apparatus also comprises means for providing with the signal processor or processing module the corresponding signaling, including where the corresponding signaling contains information about the fluid flow characteristic of the fluid flow channelized.

* * * * *